(12) United States Patent
Ibrahim et al.

(10) Patent No.: US 11,018,916 B2
(45) Date of Patent: May 25, 2021

(54) TECHNIQUES FOR TRANSMISSION BASED ON NUMEROLOGY SELECTION

(71) Applicant: Huawei Technologies Duesseldorf GmbH, Duesseldorf (DE)

(72) Inventors: Mohamed Ibrahim, Munich (DE); Wen Xu, Munich (DE)

(73) Assignee: Huawei Technologies Duesseldorf GmbH, Duesseldorf (DE)

( * ) Notice: Subject to any disclaimer, the term of this patent is extended or adjusted under 35 U.S.C. 154(b) by 0 days.

(21) Appl. No.: 16/428,610

(22) Filed: May 31, 2019

(65) Prior Publication Data
US 2019/0288898 A1 Sep. 19, 2019

Related U.S. Application Data

(63) Continuation of application No. PCT/EP2016/079603, filed on Dec. 2, 2016.

(51) Int. Cl.
*H04L 27/26* (2006.01)
*H04B 17/336* (2015.01)
*H04B 1/02* (2006.01)

(52) U.S. Cl.
CPC ....... *H04L 27/2627* (2013.01); *H04B 17/336* (2015.01); *H04L 27/2602* (2013.01); *H04L 27/2646* (2013.01); *H04B 1/02* (2013.01)

(58) Field of Classification Search
CPC ............. H04L 27/2627; H04L 27/2646; H04L 27/2602; H04B 17/336; H04B 1/02
See application file for complete search history.

(56) References Cited

U.S. PATENT DOCUMENTS

| 10,868,653 | B2* | 12/2020 | Iyer ...................... H04B 7/0617 |
| 2007/0195690 | A1* | 8/2007 | Bhushan ................ H04L 5/0048 370/208 |
| 2015/0215148 | A1 | 7/2015 | Taori et al. |
| 2015/0319748 | A1* | 11/2015 | Huang ................... H04W 24/08 370/329 |
| 2017/0111930 | A1* | 4/2017 | Rajagopal ........... H04W 74/006 |
| 2017/0163463 | A1* | 6/2017 | Werner ................. H04L 5/0007 |
| 2020/0029291 | A1* | 1/2020 | Siomina .............. H04L 27/2646 |

OTHER PUBLICATIONS

Zaidi, A. et al. "VJaveform and Numerology to Support 5G Services and Requirements", IEEE Communications Magazine, IEEE Service Center, Piscataway, US, vol 54, No. 11, Nov. 1, 2016 (Nov. 1, 2016), pp. 90-98, total 10 pages.
Mohamed, I. et al. "On Numerology and Capacity of the Self-Contained Frame Structure", 2016 IEEE Globecom Workshops(GC WKSHPS), IEEE, Dec. 4, 2016 (Dec. 4, 2016 ), pp. 1-6, total 6 pages.

* cited by examiner

*Primary Examiner* — Tejis Daya
(74) *Attorney, Agent, or Firm* — Leydig, Voit & Mayer, Ltd.

(57) ABSTRACT

The disclosure relates to a transmitter device for use in a wireless communication system, the transmitter device comprising: a processor configured to select a numerology set from a quantity of at least two numerology sets, wherein the numerology set identifies a set of transmission parameters for transmitting a transmit signal over a transmission channel, wherein the selection is based on a Signal-to-Noise Ratio (SNR) of the transmission channel; and a transmitter, configured to transmit the transmit signal based on the selected numerology set.

17 Claims, 15 Drawing Sheets

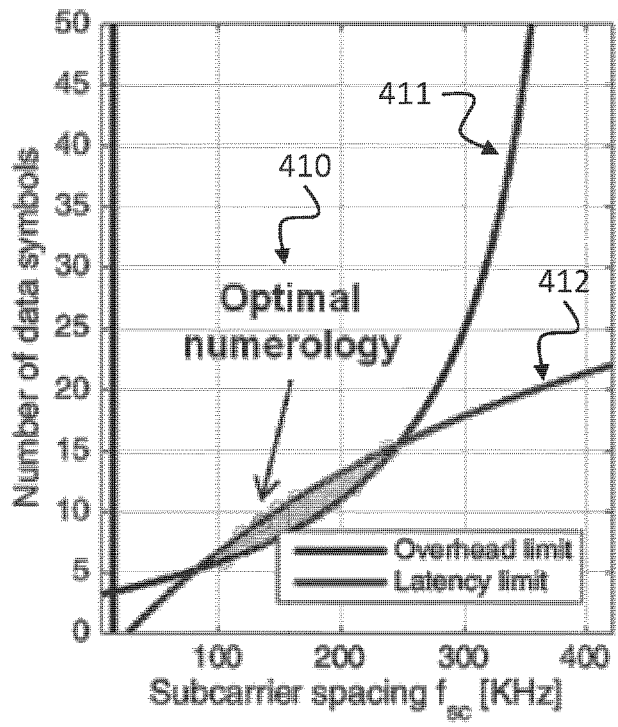
Fig. 4A
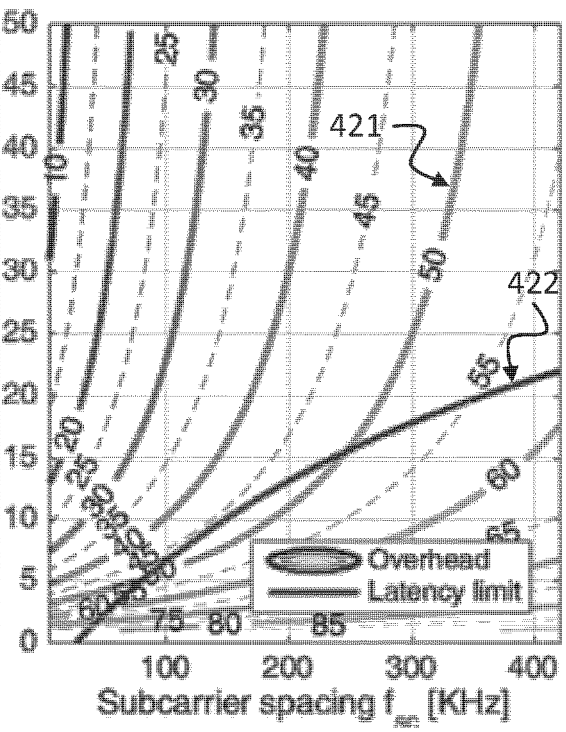
Latency = 125 µs    Fig. 4B
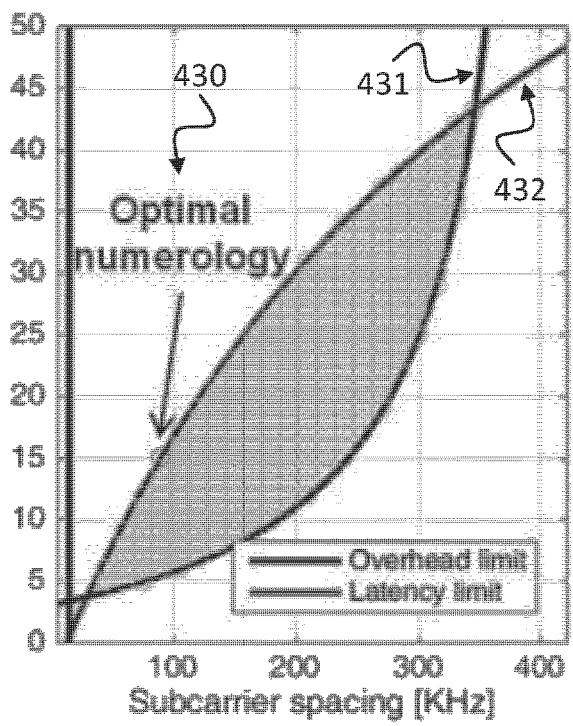
Fig. 4C
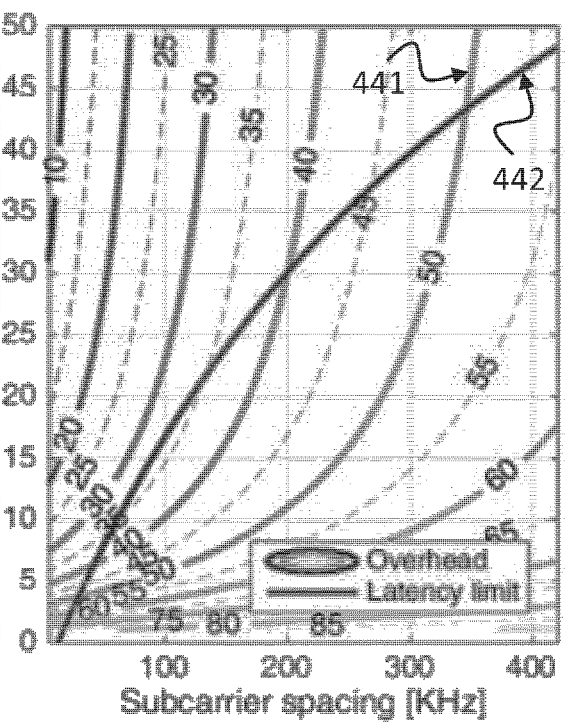
Latency = 250 µs    Fig. 4D

TECHNIQUES FOR TRANSMISSION BASED ON NUMEROLOGY SELECTION

CROSS-REFERENCE TO RELATED APPLICATIONS

This application is a continuation of International Application No. PCT/EP2016/079603, filed on Dec. 2, 2016, the disclosure of which is hereby incorporated by reference in its entirety.

TECHNICAL FIELD

The present disclosure relates to techniques for transmitting transmit signals, in particular multicarrier signals and single-carrier signals, in communication systems based on selection of a numerology set which identifies a set of transmission parameters for transmitting the transmit signal over the transmission channel. In particular, the present disclosure relates to a method and device for choosing a numerology, e.g. in terms of multicarrier parameters according to the channel parameters like SNR (signal-to-noise ratio), in particular under latency constraints.

BACKGROUND

Numerology defines a set of transmission parameters which are usually determined by hardware system requirements. Tuning of such parameters is performed within limits dictated by the hardware. For example, in an LTE (Long Term Evolution) transceiver with 15 kHz subcarrier spacing, FFTs (Fast Fourier Transforms) can be easily implemented if the operating subcarrier spacing is a multiple of the base subcarrier spacing of 15 KHz. Thus, increasing the subcarrier spacing by factors of 2 (30, 60 kHz, etc.) facilitates the implementation of the hardware design. Such approaches are proposed in 3GPP standardization for 5G. In addition, sometimes the subcarrier spacing and Cyclic Prefix (CP) are tuned in the hardware design to conserve the CP overhead. For example, in LTE the CP overhead is 4.67/71=6.5%. Hence, when the subcarrier spacing is set to 60 KHz then the CP is also scaled by a factor of in order to maintain the 6.5% overhead, resulting in a CP of 1.167 µs.

Such approaches, however, have disadvantages in terms of performance and latency, in particular in the presence of channel distortions. For example, the scaling of the CP to keep the CP overhead constant leads to a loss in performance due to multipath scattering of the channel. Additionally, factor scaling of the subcarrier spacing ($2^k$ times·15 KHz) limits the possibility of intermediate subcarriers which might provide performance by balancing Inter Carrier Interference and CP overhead.

SUMMARY

It is the object of embodiments of the disclosure to provide a concept for providing transmission techniques that are flexible in terms of latency constraints and performance requirements, in particular in the presence of channel distortions.

This object is achieved by the features of the independent claims. Further implementation forms are apparent from the dependent claims, the description and the figures.

A basic idea of embodiments of the disclosure is the finding that as the channel condition gets better (SNR gets higher), the set of possible numerologies of the transmission system, in particular the multicarrier system, gets larger (i.e. fine resolution). Numerology sets at low SNRs are subsets of the numerologies at higher SNRs (i.e. coarse resolution). The disclosure introduces different transmission techniques and scenarios where this finding can be applied.

The transmission (and reception) devices described herein may be implemented in wireless communication networks, in particular communication networks based on mobile communication standards such as LTE, in particular LTE-A and/or OFDM. The transmission (and reception) devices described herein may further be implemented in a mobile device (or mobile station or User Equipment (UE)), for example in the scenario of device-to-device (D2D) communication where one mobile device communicates with another mobile device. The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

D2D communications in cellular networks is defined as direct communication between two mobile devices or mobile users without traversing the Base Station (BS) or eNodeB or the core network. D2D communications is generally non-transparent to the cellular network and can occur on the cellular spectrum (i.e., inband) or unlicensed spectrum (i.e., outband). D2D communications can highly increase spectral efficiency, improve throughput, energy efficiency, delay, and fairness of the network. The transmission and reception devices described herein may be implemented in mobile devices communicating under D2D scenarios. However, the transmission and reception devices described herein may also be implemented in a base station (BS) or eNodeB.

The transmission and reception devices described herein may be configured to transmit and/or receive radio signals. Radio signals may be or may include radio frequency signals radiated by a radio transmitting device (or radio transmitter or sender) with a radio frequency lying in a range of about 3 kHz to 300 GHz. The frequency range may correspond to frequencies of alternating current electrical signals used to produce and detect radio waves.

The transmission and reception devices described herein may be designed in accordance to mobile communication standards such as e.g. the Long Term Evolution (LTE) standard or the advanced version LTE-A thereof. LTE (Long Term Evolution), marketed as 4G and 5G LTE and beyond, is a standard for wireless communication of high-speed data for mobile phones and data terminals.

The transmission and reception devices described herein may be applied in OFDM systems. OFDM is a scheme for encoding digital data on multiple carrier frequencies. A large number of closely spaced orthogonal sub-carrier signals may be used to carry data. Due to the orthogonality of the sub-carriers crosstalk between sub-carriers may be suppressed.

The transmission and reception devices described herein may be applied in low latency communication schemes. Low latency is achieved by having shorter transmission time intervals (TTIs). Using shorter symbols imply larger CP overhead, hence one can resort to having fewer number of symbols per TTI. Fewer symbols per TTI imply coarser time resolution. As the available resources get scarce, the transmitter increases the modulation order and coding rate to fit into the latency deadline of the transport block. This leads to a natural loss in performance. The transmission and reception devices described herein provide a solution for that performance loss.

The transmission and reception devices described herein may be applied based on multicarrier signals and single-carrier signals, in particular based on single-carrier (SC) frequency division multiple access (FDMA) signals, filter bank multicarrier (FBMC) signals, pulse shaped OFDM signals and/or filtered OFDM signals.

Single-carrier FDMA (SC-FDMA) is a frequency-division multiple access scheme. Similar to other multiple access schemes like TDMA, FDMA, CDMA and OFDMA, it deals with the assignment of multiple users to a shared communication resource. SC-FDMA can be interpreted as a linearly pre-coded OFDMA scheme, in the sense that it has an additional DFT processing step preceding the conventional OFDMA processing (see FIG. 14 below). SC-FDMA is an attractive alternative to OFDMA, especially in the uplink communications where lower PAPR (peak-to-average power ratio) greatly benefits the mobile terminal in terms of transmit power efficiency and reduced complexity of the power amplifier. It has been adopted as the uplink multiple access scheme in 3GPP LTE, or Evolved UTRA (E-UTRA). SC-FDMA's advantage of low PAPR makes it favorable for uplink wireless transmission in mobile communication systems, where transmitter power efficiency is of vital importance.

Multi-Carrier Code Division Multiple Access (MC-CDMA) is a multiple access scheme used in OFDM-based communication systems, allowing the system to support multiple users at the same time. MC-CDMA spreads each user symbol in the frequency domain. That is, each user symbol is carried over multiple parallel subcarriers, but it is phase shifted according to a code value. The code values differ per subcarrier and per user. The receiver combines all subcarrier signals, by weighting these to compensate varying signal strengths and undo the code shift. The receiver can separate signals of different users, because these have different (e.g. orthogonal) code values.

The transmission and reception devices described herein may be applied based on wireless channels, digital subscriber line (DSL) channels, powerline channels, optical channels, cable channels and/or satellite channels.

Communications systems like wireless, DSL, powerline, optical, cable, satellite, etc. usually have the same transmit and receive components (e.g. coding, modulation, equalization, etc.). The only or main difference is the transmission channel (which may be an optical channel, wireless channel, etc.). These communication systems usually use a framed transmission. The numerologies of a communication system are selected/defined differently mainly according to the channel. Although a main aspect of the disclosure is to present techniques for choosing these numerologies for wireless communications, these principles are valid as well for other communications such as DSL, powerline, optical, cable, satellite, etc.

In order to describe embodiments of the disclosure in detail, the following terms, abbreviations and notations will be used:
FDD: Frequency Division Duplex
TDD: Time Division Duplex
D2D: Device-to-device
OFDM: Orthogonal Frequency Division Multiplex
DL: Downlink
UL: Uplink
BS: Base Station, eNodeB, eNB
UE: User Equipment, e.g. a mobile device or a machine type communication device
4G: 4th generation according to 3GPP standardization
5G: 5th generation according to 3GPP standardization
LTE: Long Term Evolution
RF: Radio Frequency
GP: Guard Period
MBB: Mobile BroadBand
URLLC: Ultra-Reliable Low Latency Communications
FFT: Fast Fourier Transform
ACK: Acknowledgement
TTI: Transmission Time Interval
MTC: Machine Type Communication
V2V: Vehicle to Vehicle
V2X: Vehicle to Anything
TX: Transmit
RX: Receive
RS: Reference Signal
CTL: Control data
PHY: Physical layer (device)
CP: Cyclic Prefix
ISI: Inter-symbol Interference
RMS: Root Mean Square
SNR: Signal-to-Noise Ratio
AWGN: Additive White Gaussian Noise
ICI: Inter Carrier Interference
MC: Multicarrier (signal)
SC: Single-carrier (signal)

According to a first aspect, embodiments of the disclosure relates to a transmitter device for use in a communication system, the transmitter device comprising: a processor configured to select a numerology set from a quantity of at least two numerology sets, wherein the numerology set identifies a set of transmission parameters for transmitting a transmit signal over a transmission channel, wherein the selection is based on a Signal-to-Noise Ratio (SNR) of the transmission channel; and a transmitter, configured to transmit the transmit signal based on the selected numerology set.

By such a selection of a numerology set for a transmission of the transmit signal flexible latency constraints and performance requirements can be considered. In particular the presence of channel distortions can be considered by the SNR. Thus optimal transmission with respect to throughput and latency can be obtained.

In a first possible implementation form of the transmitter device according to the first aspect, the transmit signal is one of a multicarrier signal or a single-carrier signal, in particular one of a single-carrier (SC) frequency division multiple access (FDMA) signal, a filter bank multicarrier (FBMC) signal, a pulse shaped OFDM signal or a filtered OFDM signal; and the transmission channel is one of a wireless channel, digital subscriber line (DSL) channel, powerline channel, optical channel, cable channel or satellite channel.

This provides the advantage that the disclosed technique can be flexibly applied to a variety of different transmit signals as well as a variety of different transmission channels.

In a second possible implementation form of the transmitter device according to the first aspect as such or according to the first implementation form of the first aspect, the numerology set identifies a set of multicarrier parameters for transmitting a multicarrier signal over a wireless channel, wherein the selection is based on a Signal-to-Noise Ratio (SNR) of the wireless channel; and the transmitter is configured to transmit the multicarrier signal based on the selected numerology set.

By such a selection of a numerology set for a transmission of the multicarrier signal flexible latency constraints and performance requirements can be considered. In particular the presence of channel distortions can be considered by the SNR. Thus optimal transmission with respect to throughput and latency can be obtained. As the channel condition gets better (SNR gets higher), the set of possible numerologies of the transmission system gets larger (i.e. fine resolution). Numerology sets at low SNRs can be efficiently applied as subsets of the numerologies at higher SNRs (i.e. coarse resolution).

In a third possible implementation form of the transmitter device according to the first aspect as such or according to any of the preceding implementation forms of the first aspect, the quantity of numerology sets, from which the processor is configured to select the numerology set, increases with increasing SNR.

This provides the advantage that with increasing SNR the transmission flexibility increases due to a higher number of numerology sets which can be selected for transmitting the transmit signal.

In a fourth possible implementation form of the transmitter device according to the first aspect as such or according to any of the preceding implementation forms of the first aspect, the quantity of numerology sets for a first SNR comprises a subset of the numerology sets of the quantity of numerology sets for a second SNR that is higher than the first SNR.

This provides the advantage that the same basis or pool of numerology sets can be used. From this pool adequate numerology set can be selected based on the determined SNR of the channel.

In a fifth possible implementation form of the transmitter device according to the first aspect as such or according to any one of the preceding implementation forms of the first aspect, a numerology set is defined for a multicarrier signal as transmit signal by a subcarrier spacing and a number of data symbols per subframe of the multicarrier signal.

This provides the advantage of efficient implementation when selection of the numerology set is performed over a two-dimensional data field that is defined by the two parameters subcarrier spacing and number of data symbols per subframe.

In a sixth possible implementation form of the transmitter device according to the first aspect as such or according to any one of the preceding implementation forms of the first aspect, the processor is configured to select the numerology set based on predetermined knowledge of the transmission channel available for the transmitter device.

This provides the advantage that the characteristics of the transmission channel, e.g. the wireless channel do not have to be computed when this knowledge is already available, hence facilitating the implementation.

In a seventh possible implementation form of the transmitter device according to the sixth implementation form of the first aspect, the processor is configured to select the numerology set based on a capacity maximization metric of the transmission channel.

This provides the advantage that the selected numerology results in an optimum capacity channel, i.e. maximum throughput.

In an eighth possible implementation form of the transmitter device according to the seventh implementation form of the first aspect, the processor is configured to determine the capacity of the transmission channel based on predicting an effective SNR at a receiver receiving the transmit signal.

This provides the advantage that the capacity of the channel can be efficiently determined by computing the effective SNR at the receiver.

In a ninth possible implementation form of the transmitter device according to the eighth implementation form of the first aspect, the processor is configured to predict the effective SNR at the receiver based on computing a theoretical minimum mean squared error from previous pilots to each data symbol received at the receiver according to second order statistics of the transmission channel, in particular according to a Doppler shift, a root mean squares (RMS) delay and a noise power of the transmission channel.

This provides the advantage that the effective SNR can be easily computed by the receiver based on available information at the receiver, e.g. in FDD, and transferred to the transmitter device, e.g. by using feedback information. In TDD, the transmitter can directly compute the effective SNR due to the channel reciprocity.

In a tenth possible implementation form of the transmitter device according to the ninth implementation form of the first aspect, the processor is configured to predict the effective SNR $\gamma_1$ at the receiver based on computing the following equation:

$$\gamma_1 = \frac{(1-\varepsilon) \cdot \gamma_0}{\varepsilon \cdot \gamma_0 + 1},$$

where $\gamma_0$ denotes the nominal SNR and $\varepsilon$ denotes the averaged mean squared error.

This provides the advantage that the effective SNR can be efficiently computed by the receiver based on the nominal SNR and the averaged mean squared error available at the receiver.

In an eleventh possible implementation form of the transmitter device according to the first aspect as such or according to any one of the preceding implementation forms of the first aspect, the processor is configured to select the numerology set based on an overhead minimization metric with respect to non-data related time-frequency resources of the transmit signal.

Using the overhead minimization metric provides the advantage of having low latency when transmission is based on the selected numerology set.

In a twelfth possible implementation form of the transmitter device according to the eleventh implementation form of the first aspect, the non-data related time-frequency resources of the transmit signal comprise a guard period, a cyclic prefix and a control channel of the transmit signal.

This provides the advantage that standardized frame types like the "self-contained" frame, e.g. as shown below in FIGS. 1 and 2 can be used for transmission.

In a thirteenth possible implementation form of the transmitter device according to any of the eleventh or the twelfth implementation forms of the first aspect, the processor is configured to select the numerology set based on the overhead minimization metric if predetermined knowledge of the transmission channel is not available for the transmitter device.

This provides a higher flexibility as the transmission can be performed based on optimal numerology sets either with or without pre-known channel knowledge.

In a fourteenth possible implementation form of the transmitter device according to any of the eleventh to the thirteenth implementation forms of the first aspect, the processor is configured to compute the overhead minimization metric based on at least one of the following parameters of the transmit signal: a number of control and pilot symbols, a subcarrier spacing, a cyclic prefix (CP), a number of data symbols, a guard period (GP), a latency constraint with respect to a transmission time interval (TTI).

This provides high flexibility and redundancy for computing the minimization metric as a lot of parameters can be used for the computation.

In a fifteenth possible implementation form of the transmitter device according to the fourteenth implementation form of the first aspect, the processor is configured to compute the overhead minimization metric based on the following equation:

$$n_D^{opt} = \pm \sqrt{\frac{T_{LAT} - 2T_{GP}}{T_{CP}}} - n_T \; f_{sc}^{opt} = \frac{1}{\frac{T_{LAT} - 2T_{GP}}{\sqrt{\frac{T_{LAT} - 2T_{GP}}{T_{CP}}}} - T_{CP}},$$

where $n_T$ is the total number of control and pilot symbols, $f_{sc}$ is the subcarrier spacing, $T_{CP}$ is the CP, $n_D$ is the number of data symbols, $T_{GP}$ is the guard period and $\tau_{LAT}$ is the latency constraint for which the following latency constraint is applied:

$(n_D+n_T)(1/f_{sc})+2T_{GP} < \tau_{LAT}$

This provides the advantage that the selected numerology set is an optimal one as a result of using a Lagrangian optimizer.

In a sixteenth possible implementation form of the transmitter device according to the first aspect as such or according to any one of the preceding implementation forms of the first aspect, the transmitter is configured to signal the selected numerology to a receiver receiving the transmit signal in a control channel.

This provides the advantage that the selected numerology is known to the receiver which can also apply the selected numerology for adjusting its reception parameters. Thus optimal reception can be guaranteed.

According to a second aspect, embodiments of the disclosure relates to a method for transmitting a transmit signal in a communication system, the method comprising: selecting a numerology set from a quantity of at least two numerology sets, wherein the numerology set identifies a set of transmission parameters for transmitting a transmit signal over a transmission channel, wherein the selection is based on a Signal-to-Noise Ratio (SNR) of the transmission channel; and transmitting the transmit signal based on the selected numerology set.

By such a selection of a numerology set for a transmission of the transmit signal flexible latency constraints and performance requirements can be considered. In particular the presence of channel distortions can be considered by the SNR. Thus optimal transmission with respect to throughput and latency can be obtained.

According to a third aspect, embodiments of the disclosure relates to a communication system using a TDD frame structure which operates with at least two different numerology sets depending on the SNR.

By operating with at least two different numerology sets, flexible latency constraints and performance requirements can be considered. In particular the presence of channel distortions can be considered by the SNR. Thus optimal transmission with respect to throughput and latency can be obtained. As the channel condition gets better (SNR gets higher), the set of possible numerologies of the transmission system gets larger (i.e. fine resolution). Numerology sets at low SNRs can be efficiently applied as subsets of the numerologies at higher SNRs (i.e. coarse resolution).

In a first possible implementation form of the communication system according to the third aspect, at high SNRs, the numerology has a finer quantization grid compared to lower SNRs.

In a second possible implementation form of the communication system according to the third aspect as such or according to the first implementation form of the third aspect, the numerology set of low SNR is a subset of the high SNR numerology.

In a third possible implementation form of the communication system according to the third aspect as such or according to any of the preceding implementation forms of the third aspect, a numerology is defined as a pair of subcarrier spacing and number of data symbols.

In a fourth possible implementation form of the communication system according to the third aspect as such or according to any of the preceding implementation forms of the third aspect, the larger set is used at high SNR regimes and the smaller set at lower SNR regimes.

In a fifth possible implementation form of the communication system according to the third aspect as such or according to any of the preceding implementation forms of the third aspect, the choice of the numerology is based on a metric which minimizes the non-data overhead of the system.

In a sixth possible implementation form of the communication system according to the third aspect as such or according to any of the preceding implementation forms of the third aspect, the non-data overhead is defined as the GP, CP and control channel.

In a seventh possible implementation form of the communication system according to the third aspect as such or according to any of the preceding implementation forms of the third aspect, the choice of the numerology is based on a metric which maximizes the capacity of a link.

In an eighth possible implementation form of the communication system according to the third aspect as such or according to any of the preceding implementation forms of the third aspect, the transmitter signals the chosen numerology to the receiver in a control channel.

BRIEF DESCRIPTION OF THE DRAWINGS

Further embodiments of the disclosure will be described with respect to the following figures, in which:

FIGS. 4A, 4B, 4C, 4D show 2-dimensional diagrams of data symbols versus subcarrier spacing for illustrating the location of optimal numerologies according to an implementation form;

DETAILED DESCRIPTION OF EMBODIMENTS

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

It is understood that comments made in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Figure 1:
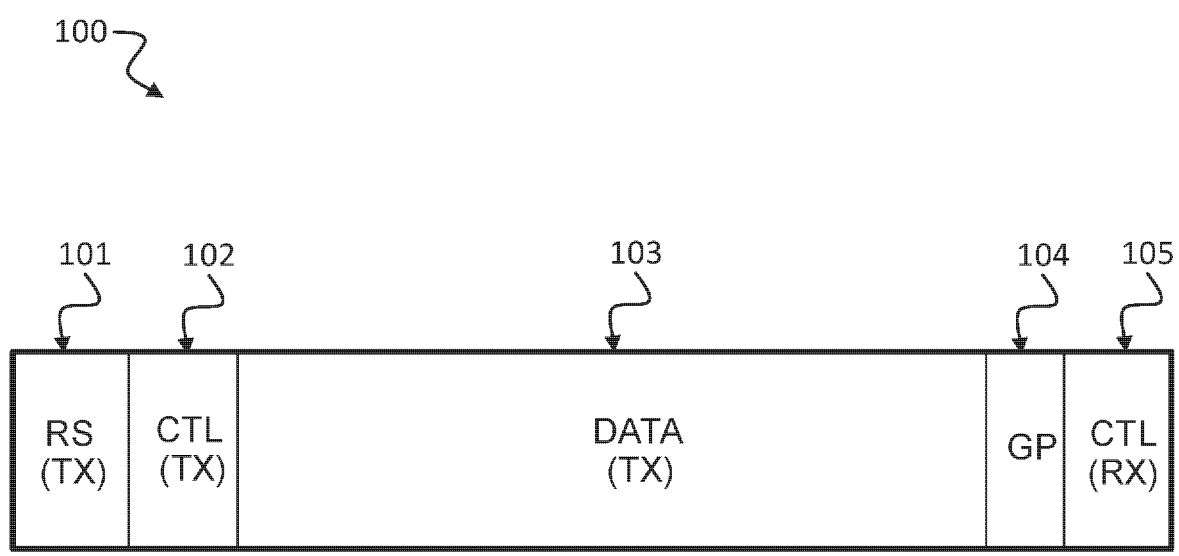
FIG. 1 shows a schematic diagram illustrating a self-contained frame structure 100 according to the disclosure.

FIG. 1 shows a schematic diagram illustrating a self-contained frame structure 100 according to the disclosure. The self-contained frame structure 100 includes an RS section 101 (reference signal or pilot section) for TX, a CTL section 102 (control data section) for TX, a TX data section 103, a guard period (GP) section 104 and a CTL section 105 for RX.

The so called "self-contained" frame structure 100 which has a structure as shown in FIG. 1 is currently considered by standardization. The frame 100 is TDD (Time Division Duplex) and starts with the transmitter portion which has a preamble Reference Signal 101, followed by a control part 102 followed by the data part 103 as mentioned above. Afterwards there is a guard period 104 and finally comes the receiver's transmission 105 which usually contains only control information, however may also have data information. The following parameters are designed for this frame structure 100: 1) TTI (Transmission Time Interval): This represents the latency constraint on the PHY (Physical) layer and is usually set as an upper bound for the numerology choice. 2) Subcarrier spacing: defines the symbol duration hence has direct impact on the TTI; 3) Cyclic Prefix (CP): The longer the lower Inter Symbol Interference (ISI); 4) Guard Period (GP): Important for switching between transmission and reception (and vice versa). Should be long enough to cover the round trip propagation delay, hence it is larger in large cells; 5) Number of data symbols; 6) Number of control symbols: How much signaling is needed per subframe.

The disclosure defines a method to tune the numerology parameters described above. There are two methods to tune the numerology: a) In case channel knowledge is not available at the transmitter side, the overhead is minimized (spectral efficiency maximized) according to an optimal function. b) If the channel knowledge is available at the transmitter, the numerology is chosen to achieve the maximum possible capacity, which takes the overhead into account as well.

For both cases, some numerology parameters are fixed based on physical constraints, so that one ends up with only 2 parameters to optimize: The subcarrier spacing and the number of data symbols per frame. The following parameters are tuned according to the following reasoning: A) CP: Depending on the channel environment, the CP can be tuned according to the RMS (Root mean square) delay. For example, a base station located on a highway will have a fixed CP which is shorter than that of a base station in an urban environment; B) GP: Depending on the radius of the cell, the GP is tuned; C) Number of control symbols: Depending on the service, the signaling overhead may require different amount of control symbols. For example, Machine Type Communications (MTC) with periodic traffic may require few control symbols due to the fixed transmission pattern, while ad-hoc V2X with different services may require several control symbols.

Figure 2:
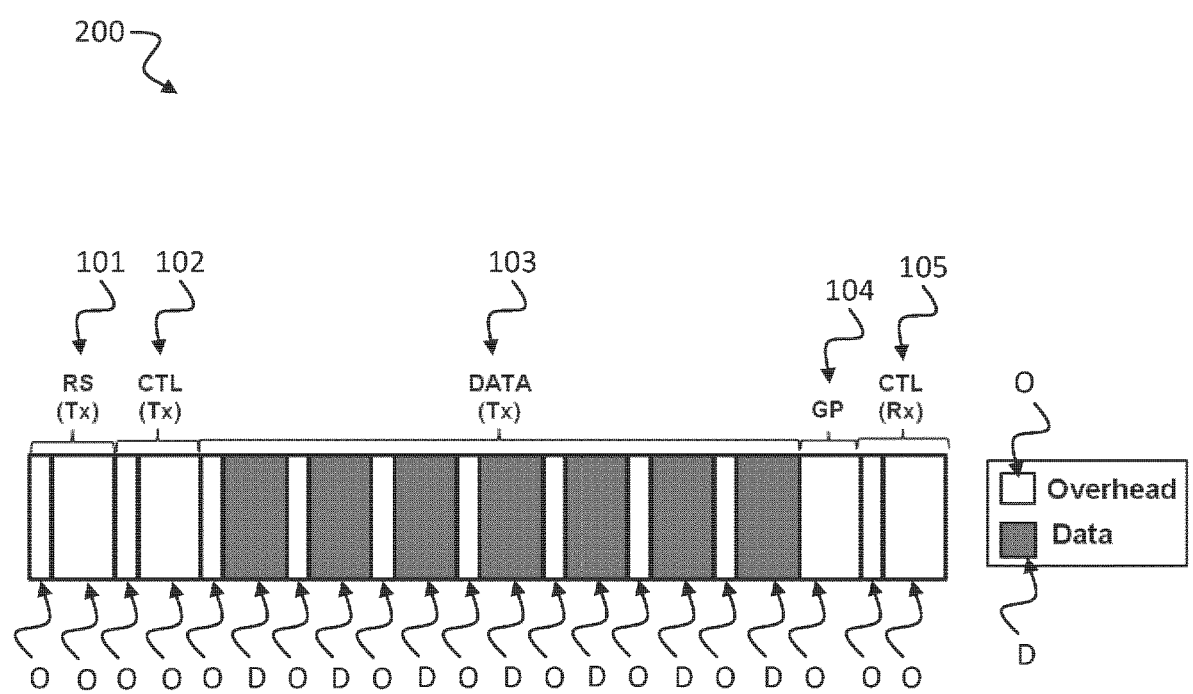
FIG. 2 shows a schematic diagram illustrating overhead 200 for the self-contained frame structure 100 of FIG. 1 according to the disclosure.

FIG. 2 shows a schematic diagram illustrating overhead 200 for the self-contained frame structure 100 of FIG. 1 according to the disclosure. The frame structure corresponds to the frame structure 100 of FIG. 1. In FIG. 2 each section 101, 102, 103, 104, 105 of the frame 100 includes some overhead portion referred to as "O". The remaining portion for each section is either also overhead "O" for the sections 101, 102, 104, 105 or is data portion referred to as "D" for the data section 103.

In the following a technique for overhead minimization is described. In case channel knowledge is not available, the transmitter minimizes all the non-data related occupied time/frequency resources. The overhead "O" of the subframe is depicted in FIG. 2.

Mathematically, the overhead can be defined as follows:

$$\Gamma(f_{sc}, n_D) = \frac{n_T((1/f_{sc}) + T_{CP}) + n_D T_{CP} + 2T_{GP}}{(n_D + n_T)((1/f_{sc}) + T_{CP}) + 2T_{GP}}$$

where $n_T$ is the total number of control and pilot symbols, $f_{sc}$ is the subcarrier spacing, $T_{CP}$ is the CP, $n_D$ is the number of data symbols, $T_{GP}$ is the guard period. Additionally, the following latency constraint is applied:

$$(n_D + n_T)(1/f_{sc}) + 2T_{GP} < \tau_{LAT}$$

where $\tau_{LAT}$ is the latency constraint or TTI upper bound. The optimal subcarrier spacing and number of data symbols have been derived using a Lagrangian optimizer and the optimum solution can be represented as $$n_D^{opt} = \pm\sqrt{\frac{T_{LAT} - 2T_{GP}}{T_{CP}}} - n_T \; f_{sc}^{opt} = \frac{1}{\sqrt{\frac{T_{LAT} - 2T_{GP}}{T_{CP}}} - T_{CP}}$$

As shown, the subcarrier spacing and number of data symbols are according to the fixed parameters: GP, CP, Latency constraint and total number of control and reference signals.

Figure 3:
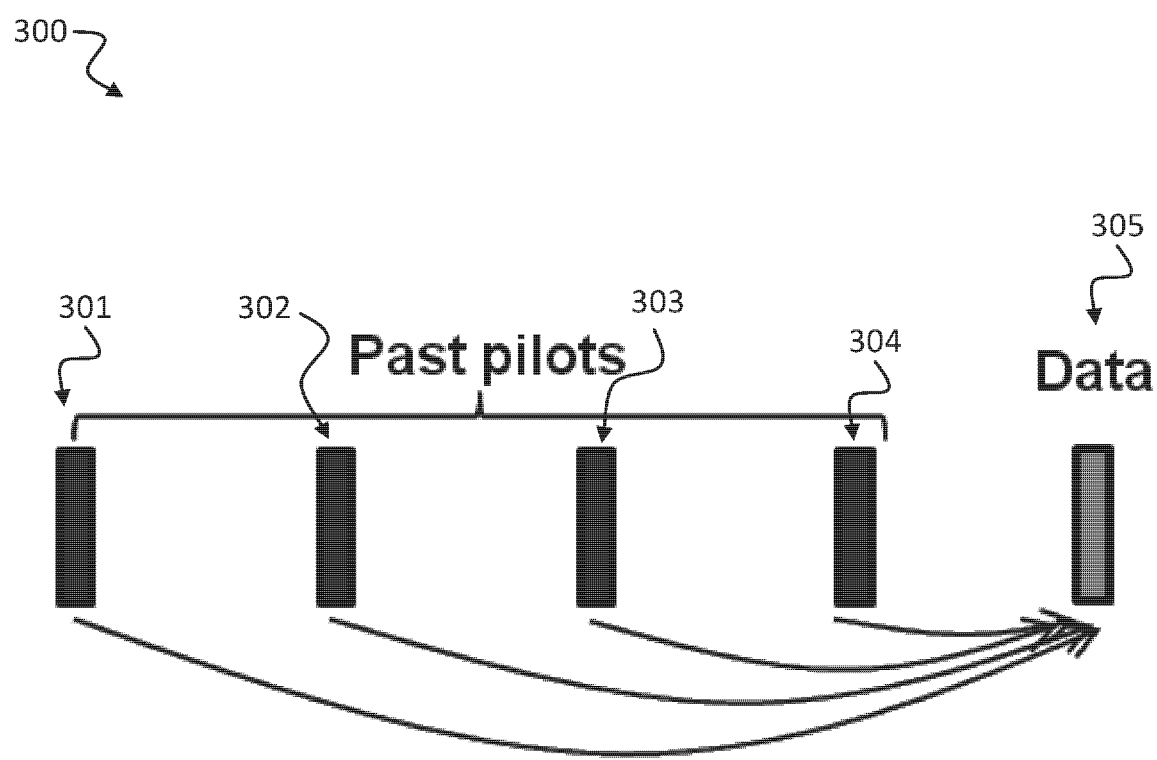
FIG. 3 shows a schematic diagram illustrating a method 300 for computing the channel estimation error according to an implementation form.

FIG. 3 shows a schematic diagram illustrating a method 300 for computing the channel estimation error according to an implementation form. In the following a technique for capacity maximization is described.

When the channel knowledge is available at the transmitter, then the capacity of the channel may be computed by predicting the effective SNR (Signal-to-noise ratio) at the receiver. The effective SNR takes into account the AWGN (Additive White Gaussian Noise) and the channel estimation error. The channel estimation error may be derived by computing the theoretical Minimum Mean Squared Error from the previous pilots 301, 302, 303, 304 to each data symbol 305 according to the channel's second order statistics such as Doppler shift, RMS (Root Mean Square) delay and noise power.

The channel estimation error may be computed for each data symbol 305 as shown in FIG. 3 and may then be averaged over all the data symbol locations in the subframe. The effective SNR may then be occupied as $$\gamma_1 = \frac{(1-\varepsilon)\cdot\gamma_0}{\varepsilon\cdot\gamma_0 + 1} \quad \begin{array}{l} \gamma_1 \;\; \text{Effective } SNR \\ \gamma_0 \;\; \text{Nominal } SNR \\ \varepsilon \;\; \text{MSE (averaged)} \end{array}$$

The effective SNR may then be used to compute the Shannon capacity of the subframe. Additionally, the Inter Carrier Interference (ICI) due to Doppler shifts and hardware imperfections such as phase noise in mmWave communications can be taken into account to further degrade the effective SNR. This is an important aspect, since at high Doppler shifts, larger subcarrier spacing are more favorable due to their robustness towards ICI.

FIGS. 4A, 4B, 4C, 4D show 2-dimensional diagrams of data symbols versus subcarrier spacing for illustrating the location of optimal numerologies according to an implementation form.

The optimal numerology 410, 430 can be visualized on a 2D figure as shown in FIGS. 4A, 4B, 4C and 4D which show the optimal numerology 410, 430 in a 2D search space. The x-axis represents the subcarrier spacing and the y-axis is the number of data symbols per subframe. The search space is quantized in x and y axis, since the number of data symbols is an integer and the subcarrier spacing is constrained to be an integer factor of a base subcarrier frequency. For standardization purposes, a base subcarrier frequency of 15 KHz is considered as in LTE (Long Term Evolution). The following parameters are used: CP=2 μs, GP=10 μs, Tx control=1 symbol, Rx control=1 symbol, Reference Signal=1 symbol.

As shown, there are two latency constraints 125 μs and 250 μs. The contour lines represent the overhead of each subcarrier-data symbols combination. The optimal numerology is chosen in order to minimize the overhead. As observed, as the latency constraint changes, the optimal solution changes. The latency constraint curve is referred in FIGS. 4A and 4C as 412, 432 while one exemplary overhead limit is referred in FIGS. 4A and 4C as 411, 431. In FIGS. 4B and 4D the latency constraint curve is referred as 422, 442 and the overhead limit is referred as 421, 441. From FIGS. 4B and 4D it can be seen that different other overhead limits are possible. The optimal numerology 410, 430 is the solution which minimizes the overhead within the latency constraint curve 412, 432 and the overhead limit curve 411, 431 as can be seen from FIGS. 4A and 4C.

Figure 5:
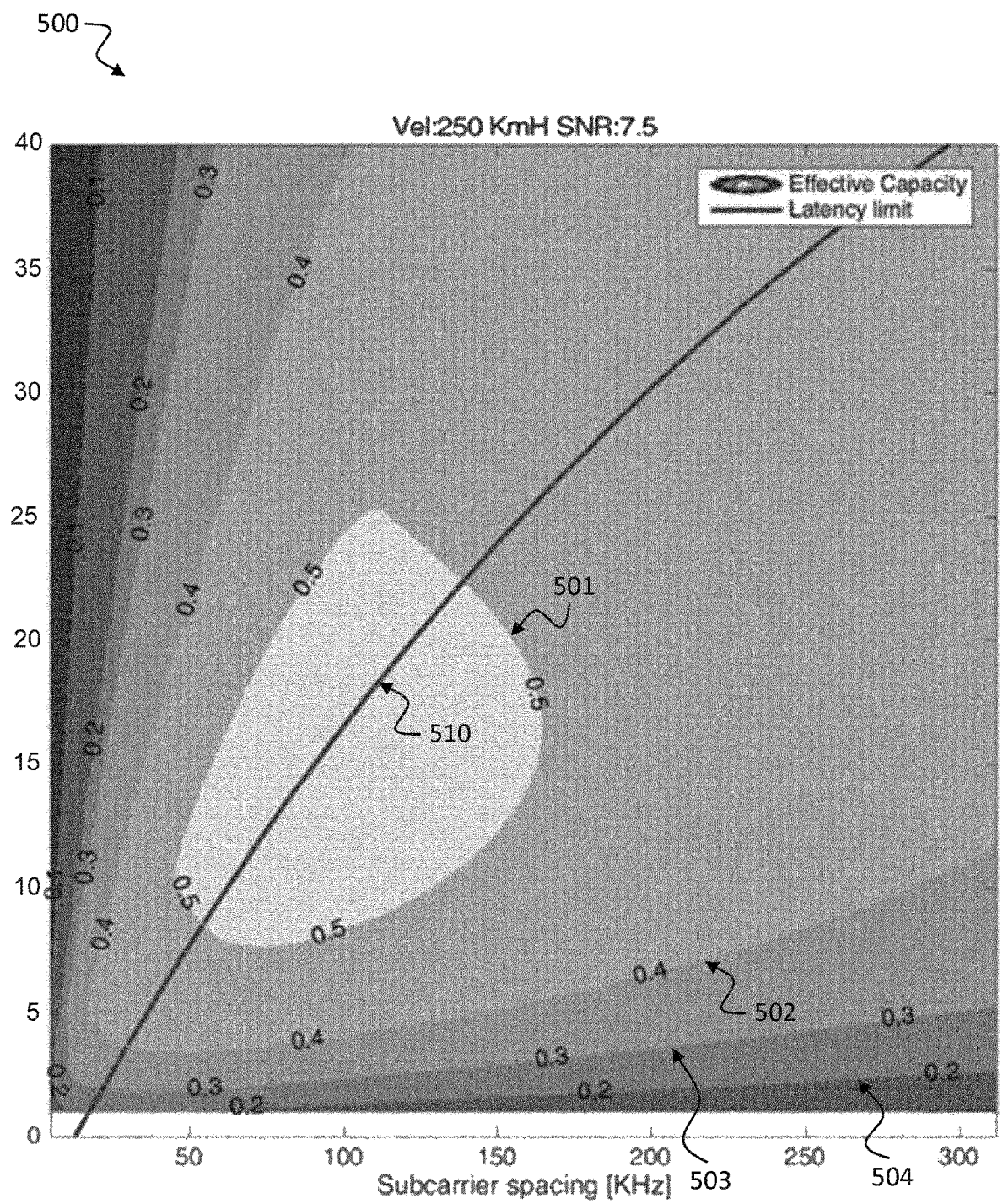
FIG. 5 shows a 2D diagram of data symbols versus subcarrier spacing 500 to illustrating an exemplary location of the optimal numerology for an SNR of 7.5 dB according to an implementation form.
Figure 6:
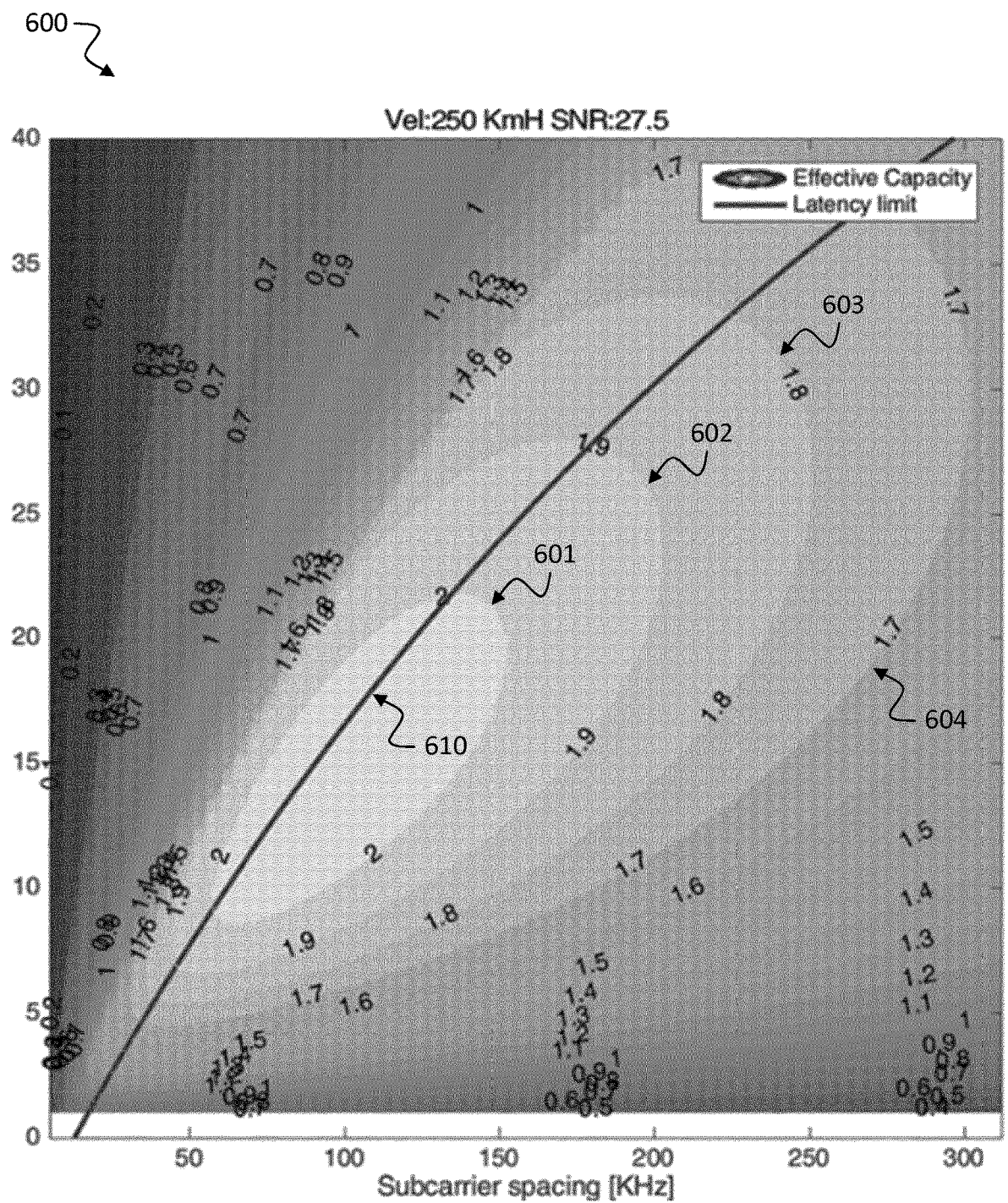
FIG. 6 shows a 2D diagram of data symbols versus subcarrier spacing 600 to illustrating an exemplary location of the optimal numerology for an SNR of 27.5 dB according to an implementation form.

FIG. 5 shows a 2D diagram of data symbols versus subcarrier spacing 500 to illustrating an exemplary location of the optimal numerology for an SNR of 7.5 dB according to an implementation form. FIG. 6 shows a 2D diagram of data symbols versus subcarrier spacing 600 to illustrating an exemplary location of the optimal numerology for an SNR of 27.5 dB according to an implementation form. For the case of capacity maximization, FIGS. 5 and 6 show the optimal solution for low and high SNRs of 7.5 and 27.5 dB respectively. The contour lines 501, 502, 503, 504 (FIG. 5) and 601, 602, 603 (FIG. 6) define the achievable capacity for each numerology. The curve 510 (FIG. 5) and 610 (FIG. 6) shows the latency limit. The key observation here is that as the SNR increases, the choice of the numerology becomes more critical, since the contour lines 501, 502, 503, 504 get closer to each other.

Figure 7A:
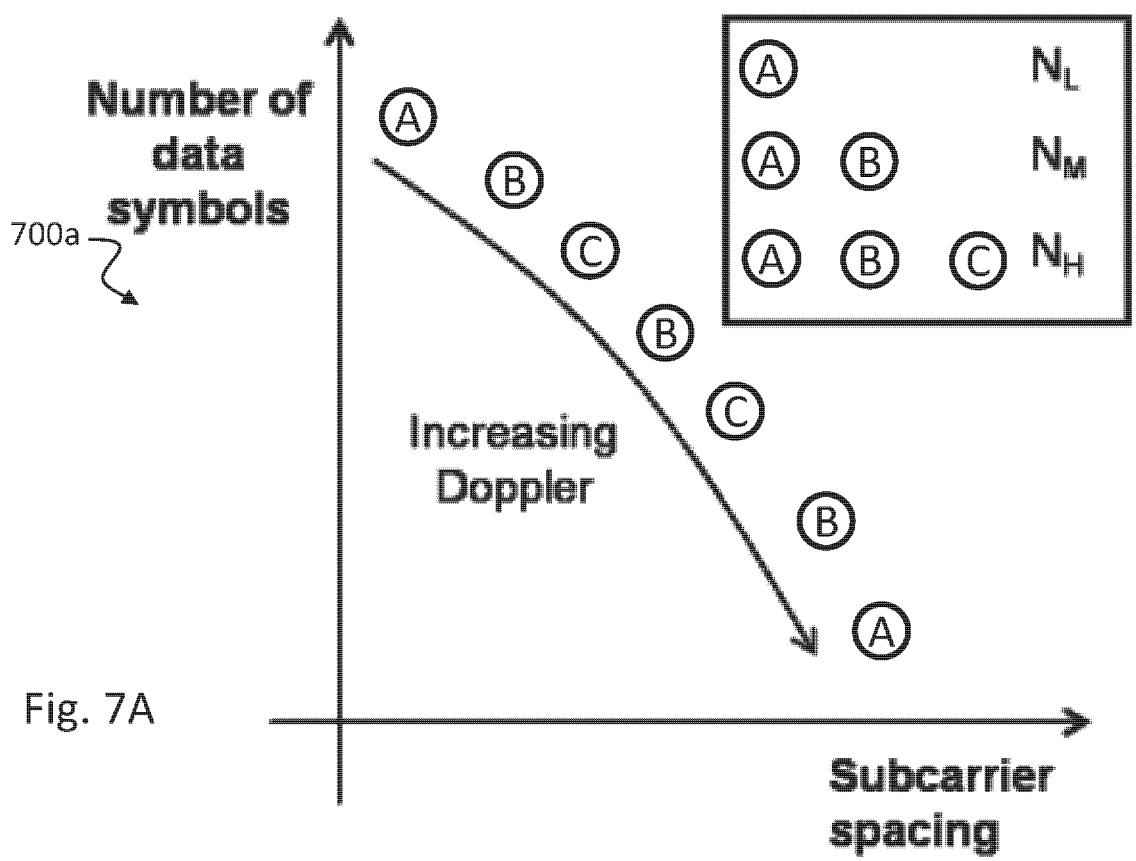
FIG. 7A shows a 2D diagram of number of data symbols versus subcarrier spacing 700a and FIG. 7B shows the supported numerology sets 700*b* to illustrate the phenomena that as the SNR increases the set of possible numerologies increases.
Figure 7B:
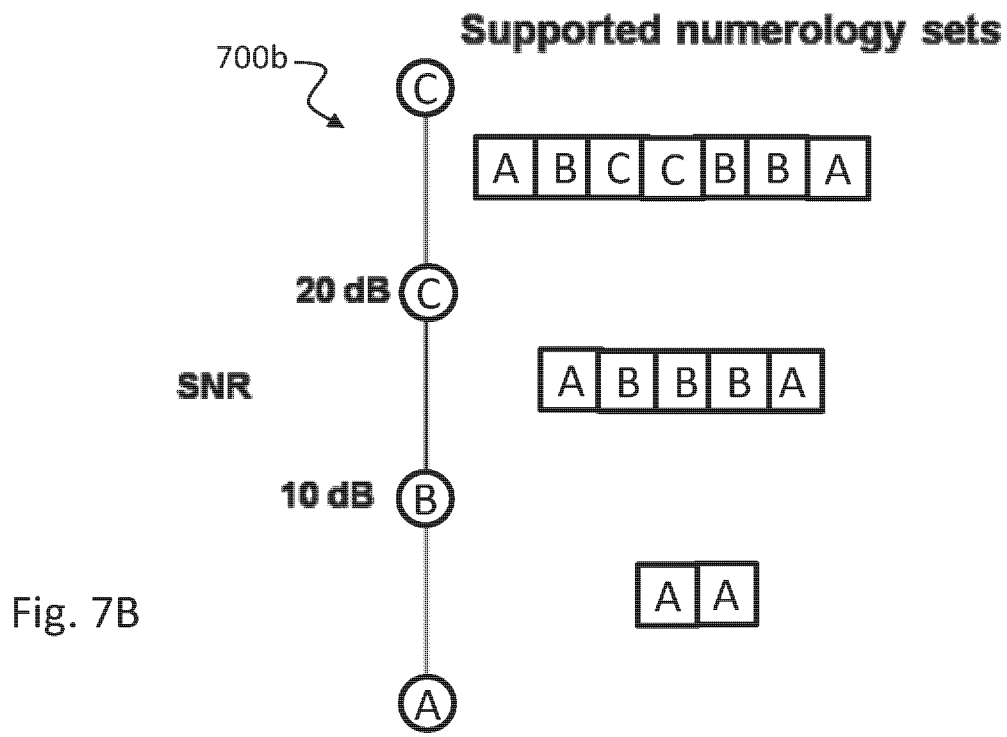

FIG. 7A shows a 2D diagram of number of data symbols versus subcarrier spacing 700a and FIG. 7B shows the supported numerology sets 700b to illustrate the phenomena that as the SNR increases the set of possible numerologies increases.

In FIG. 7B there is the numerology set A for low SNR values (e.g. between about 0 dB and 10 dB). For medium SNR values (e.g. between about 10 dB and 20 dB) numerology sets A and B are available while for high SNR values (e.g. between about 20 dB and 30 dB) numerology sets A, B and C are available.

The phenomena shown in FIGS. 7A and 7B is the basis for the core idea of this disclosure, which is that as the SNR increases the set of possible numerologies increases since one wants to be closer to the optimal numerology. The reason one has several numerologies per SNR is that as the Doppler shift/RMS delay changes, the optimal solution changes as well as shown in FIGS. 7A and 7B.

The fact that more numerologies are possible at higher SNRs means that more control bits are needed to indicate which numerology is chosen. This is acceptable since at higher SNR the control channel may change its Modulation and Coding Scheme (MCS) to fit into the same resources.

The functional feature of the disclosure can be shown in these Figures for both numerology tuning methods described.

Figure 8:
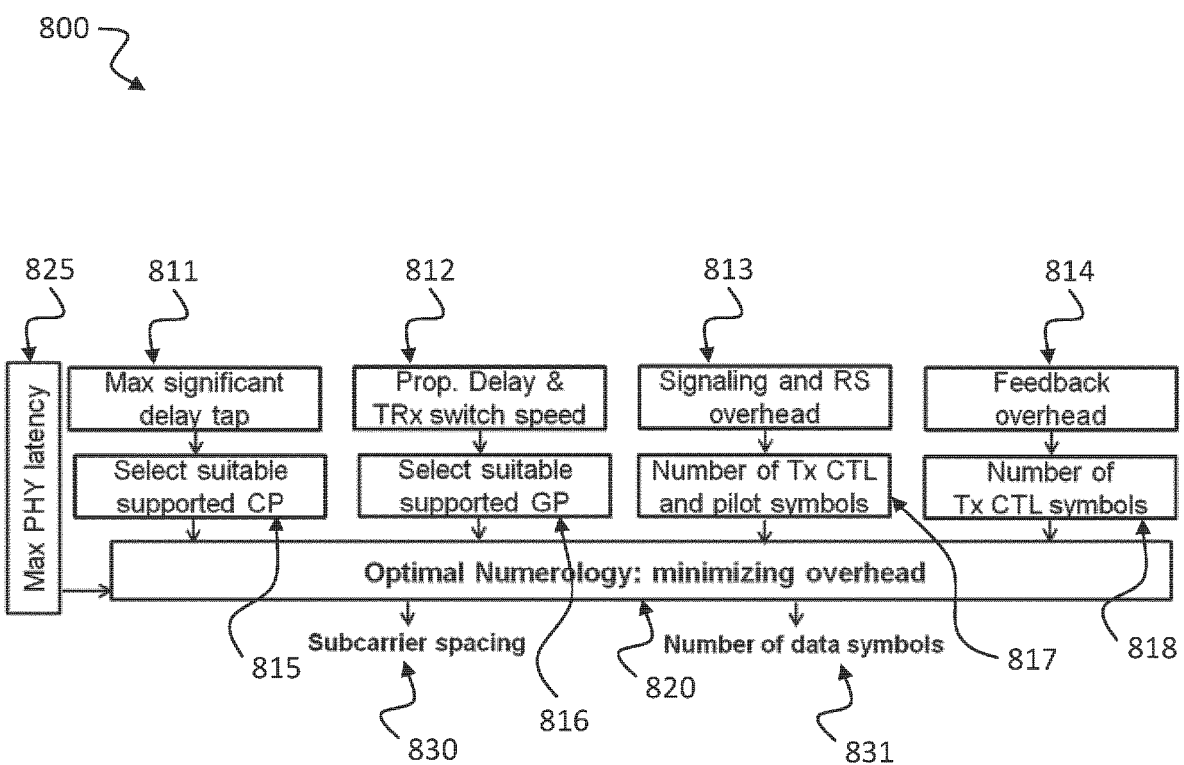
FIG. 8 shows a schematic diagram illustrating the numerology tuning based on overhead minimization 800 according to the disclosure.

FIG. 8 shows a schematic diagram illustrating the numerology tuning based on overhead minimization 800 according to the disclosure. The optimal numerology for minimizing overhead 820 provides the output parameters: subcarrier spacing 830 and number of data symbols 831 based on the input parameters: Maximum PHY latency 825, selected CP 815, selected GP 816, number of Nx CTL and pilot symbols 817 and number of Tx CTL symbols 818. Suitable supported CP is selected 815 based on maximum significant delay tap 811. Suitable supported GP is selected 816 based on propagation delay and TRx switch speed 812. Number of Tx CTL and pilot symbols 817 are determined based on signaling and RS overhead 813, e.g. as described above with respect to FIG. 2. Number of Tx CTL 818 is determined based on feedback overhead 814.

Figure 9:
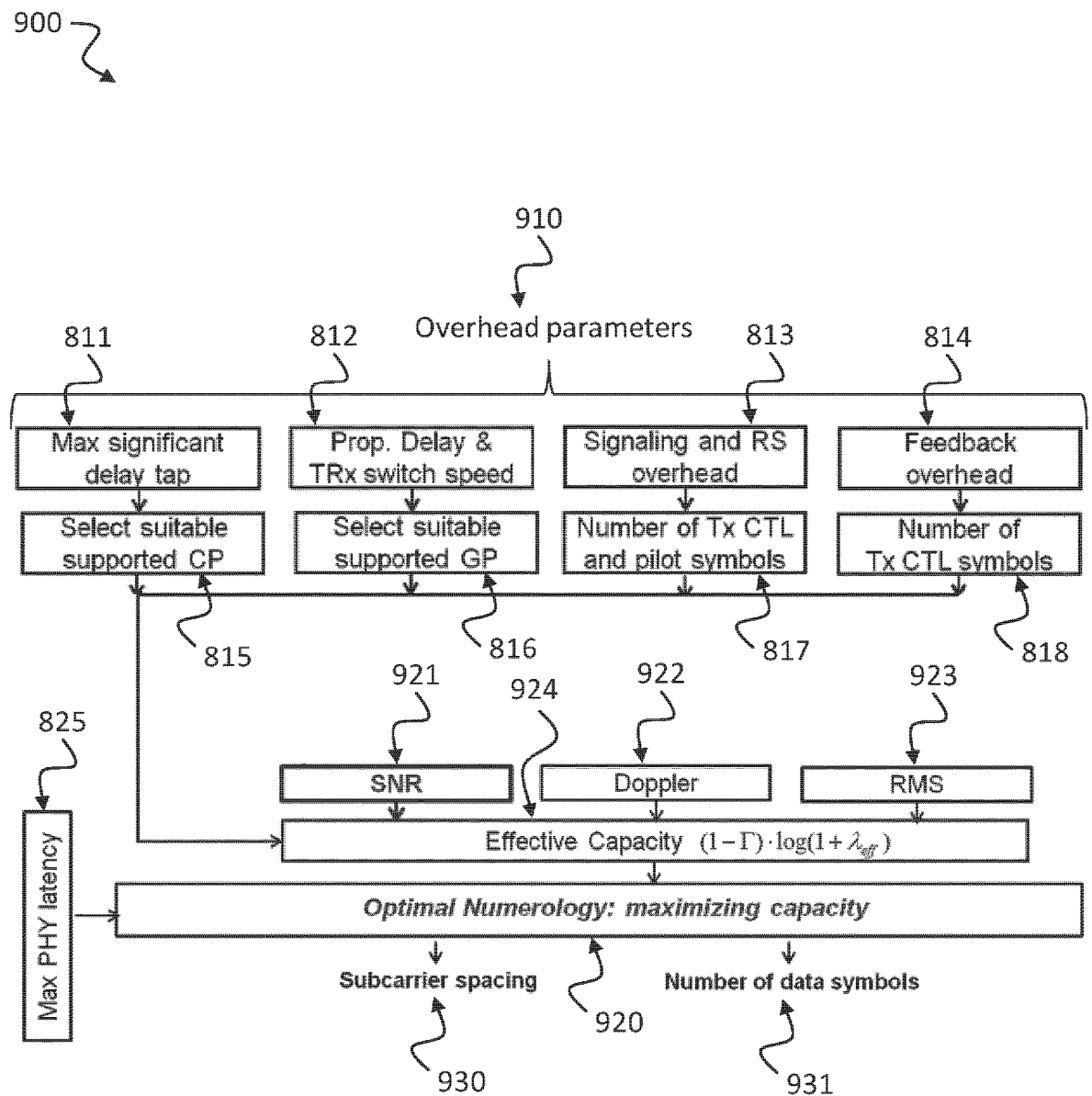
FIG. 9 shows a schematic diagram illustrating the numerology tuning based on capacity maximization 900 according to the disclosure.

FIG. 9 shows a schematic diagram illustrating the numerology tuning based on capacity maximization 900 according to the disclosure.

The optimal numerology for maximizing (channel) capacity 920 provides the output parameters: subcarrier spacing 930 and number of data symbols 931 based on the input parameters: Maximum PHY latency 825, overhead parameters 910 as described above with respect to FIG. 8, SNR 921, Doppler 922 and RMS 923. Overhead parameters 910, SNR 921, Doppler 922 and RMS 923 are used to determine the effective capacity 924, e.g. by evaluating the following formula: $(1-\Gamma)\log(1+\lambda_{eff})$.

An example of implementing the disclosed concept in standard is shown in Table 1:

TABLE 1

Example for implementing the numerology tuning shown in FIGS. 8 and 9

| Latency [µs] | Numerology ID | Sub-carrier spacing | N data symbols | SNR (capacity based) | GP(µs)/CP(µs)/CTL(symbols) (overhead based) |
|---|---|---|---|---|---|
| 250 | 1 | 285 | 41 | Low/Med/High | 10/1/3 |
| 250 | 2 | 45 | 7 | Low/Med/High | 20/1/3 |
| 250 | 3 | 195 | 30 | Med/High | 10/2/3 |
| 250 | 4 | 135 | 23 | Med/High | 20/2/3 |
| 250 | 5 | 225 | 35 | Med/High | 10/1/4 |
| 250 | 6 | 60 | 11 | High | 20/1/4 |
| 250 | 7 | 105 | 17 | High | 20/1/5 |
| 500 | 1 | 15 | 7 | Low/Med/High | 10/1/3 |
| 500 | 2 | 120 | 44 | Low/Med/High | 20/1/3 |
| 500 | 3 | 75 | 31 | Med/High | 10/2/3 |
| 500 | 4 | 30 | 38 | Med/High | 20/2/3 |
| 500 | 5 | 90 | 35 | Med/High | 10/1/4 |
| 500 | 6 | 60 | 26 | High | 20/1/4 |
| 500 | 7 | 45 | 20 | High | 20/1/5 |

As shown in Table 1, for each TTI, there are several numerologies which exist. In case channel knowledge is available at the transmitter, then the effective SNR may be used to select the numerology ID (see second last column in Table 1). As shown, the low SNR case is a subset of all SNR cases. If channel knowledge is not available, the overhead criteria may be used which defines the Guard Period, Cyclic Prefix and number of control symbols (see last column in Table 1).

Figure 10:
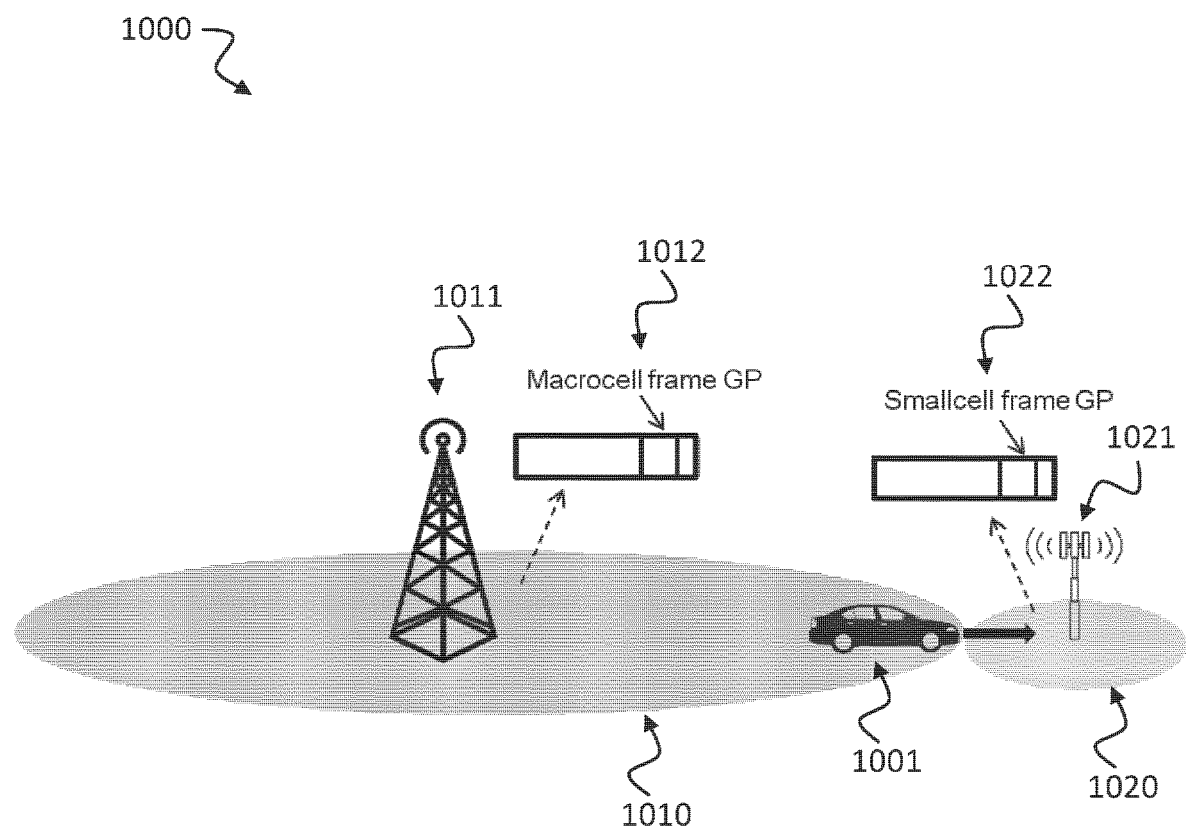
FIG. 10 shows a schematic diagram illustrating a macro cell to small cell handover scenario 1000 according to an implementation form.

FIG. 10 shows a schematic diagram illustrating a macro cell to small cell handover scenario 1000 according to an implementation form.

In this embodiment, a UE 1001 (e.g. in a car) leaving a macro cell 1010 with base station 1011 which has a large radius enters a neighboring cell 1020 which has a smaller radius. As the radius decreases, the Guard Period 1012 decreases and hence the optimal numerology is recalculated to take the new GP overhead 1022 into account and to take higher SNR of the small cell 1021 into account.

Figure 11:
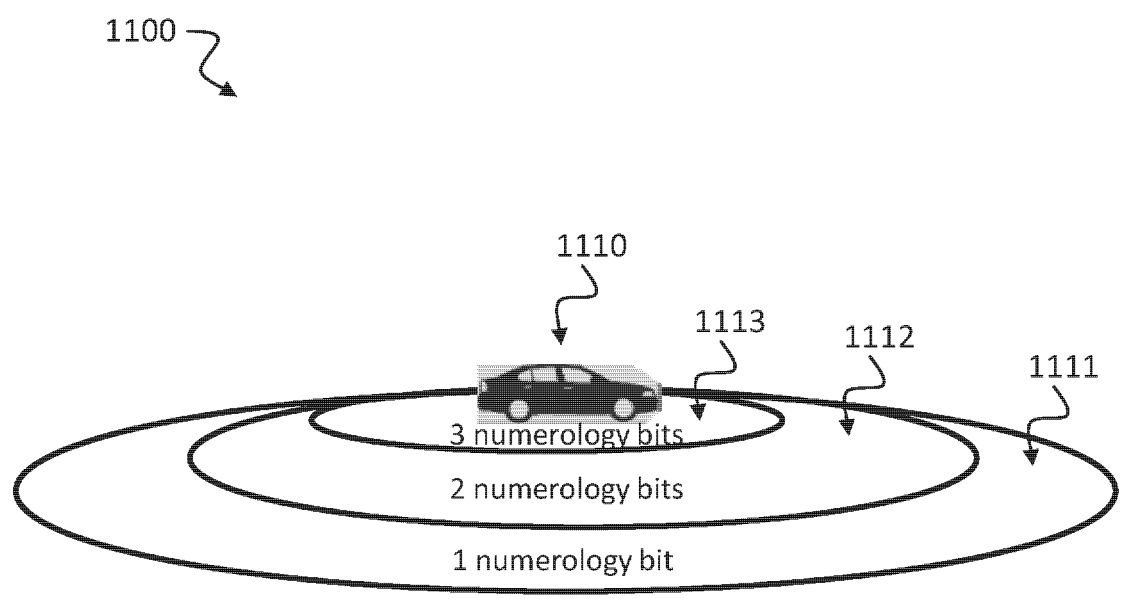
FIG. 11 shows a schematic diagram illustrating a vehicular reliability range scenario 1100 according to an implementation form.

FIG. 11 shows a schematic diagram illustrating a vehicular reliability range scenario 1100 according to an implementation form.

It is known that V2X (vehicle to anything) applications may require high reliability and low latency. Hence it is important to indicate an embodiment which reflects the V2X use case. In FIG. 11, a vehicle 1110 is shown which subdivides the distance surrounding it into concentric circles 1111, 1112, 1113: Near, medium and far. In the near range 1113, the SNR of the channel is expected to be high due to lower path loss. As the distance from the vehicle increases (low range 1113 to medium range 1112 to far range 1111), the SNR falls hence the number of bits used to signal the numerology is lower. In practice, the vehicles exchange CAM messages with each other indicating their geographical position. The relative distance between vehicles can be directly mapped to different numerology sets.

Figure 12:
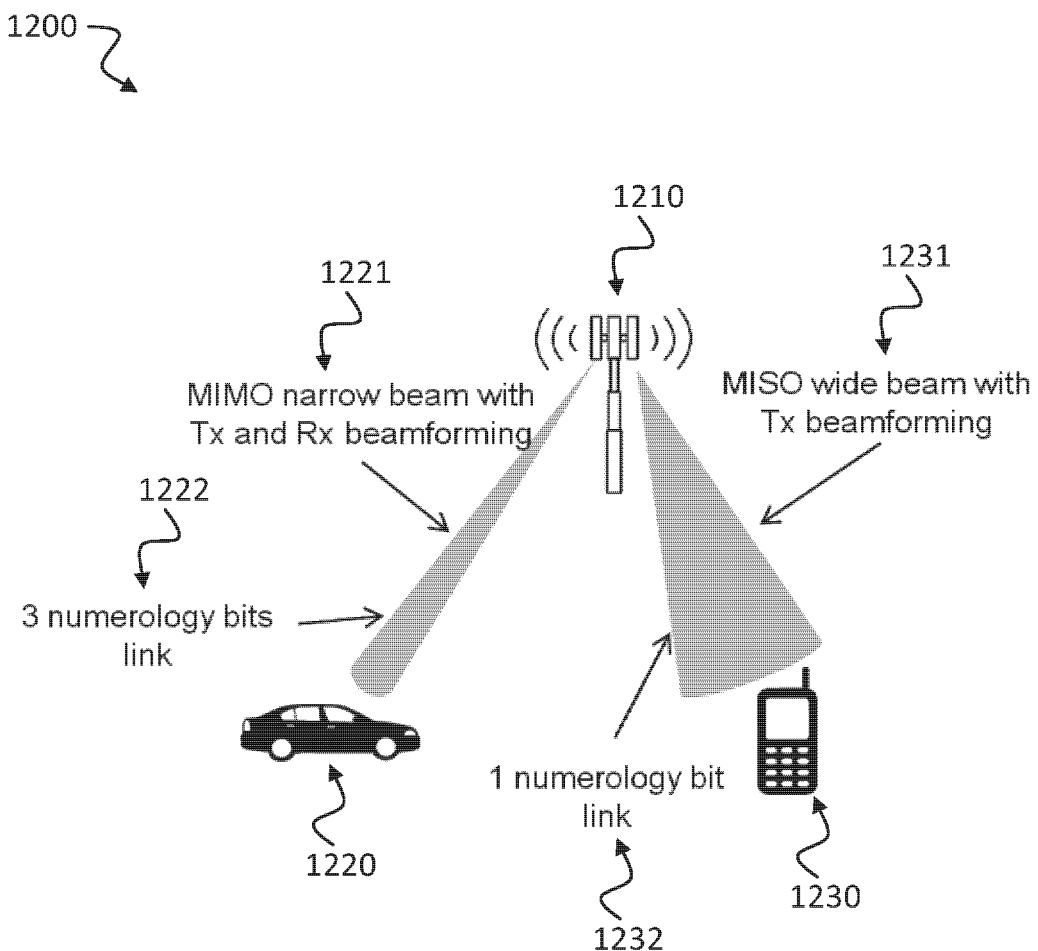
FIG. 12 shows a schematic diagram illustrating a MIMO beam scenario 1200 according to an implementation form.

FIG. 12 shows a schematic diagram illustrating a MIMO beam scenario 1200 according to an implementation form.

As shown in FIG. 12, the base station 1210 may deploy analog or digital beamforming techniques towards the communicating UEs 1220, 1230. Even if 2 UEs are geographically located at the same exact position, the effective SNR of the channel may change due to spatial diversity. For example, a vehicle 1220 equipped with multiple antennas may apply receive beamforming techniques 1221 which yield higher SNR compared to a single antenna UE 1230 having the exact same path loss (UE may apply MISO wide beam with Tx beamforming 1231). This implies, that the diversity order of the communicating nodes may be directly mapped to the number of bits used to represent the numerology set, e.g. 1 numerology bit link 1232 for the UE 1230 and 3 numerology bits link 1222 for the vehicle 1220.

Figure 13:
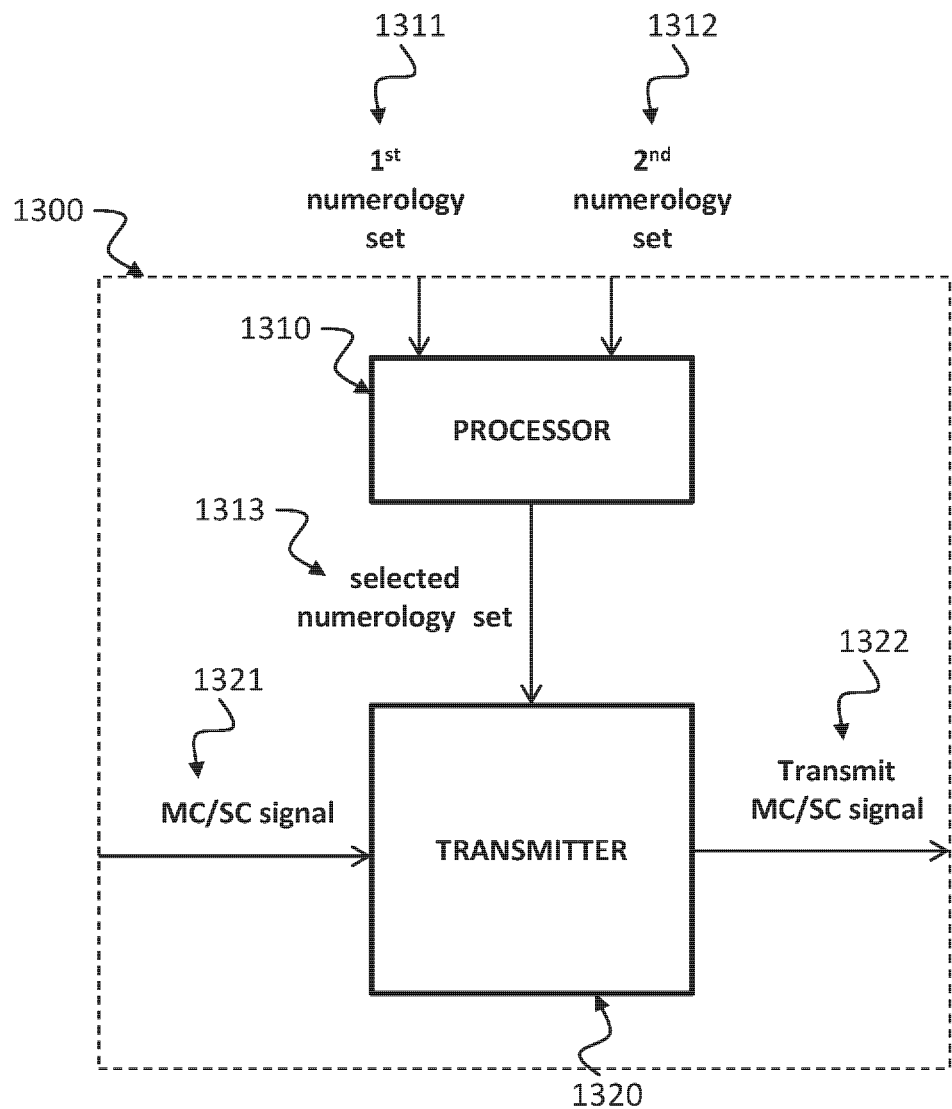
FIG. 13 shows a block diagram illustrating a transmitter device 1300 for use in a communication system according to an implementation form.

FIG. 13 shows a block diagram illustrating a transmitter device 1300 for use in a communication system according to an implementation form. The transmitter device 1300 includes a processor 1310 and a transmitter 1320.

The processor 1310 is configured to select a numerology set 1313 from a quantity of at least two numerology sets 1311, 1312. The numerology set 1313 identifies a set of transmission parameters for transmitting a transmit signal 1322 over a transmission channel. The selection is based on a Signal-to-Noise Ratio (SNR) of the transmission channel, e.g. as described above with respect to FIGS. 1 to 12. The transmitter 1320 is configured to transmit the transmit signal 1322 based on the selected numerology set 1313.

The transmission signal 1322 may be a multicarrier signal or a single-carrier signal, in particular a single-carrier (SC) frequency division multiple access (FDMA) signal, a filter bank multicarrier (FBMC) signal, a pulse shaped OFDM signal or a filtered OFDM signal. The transmission channel may be a wireless channel, a digital subscriber line (DSL) channel, a powerline channel, an optical channel, a cable channel or a satellite channel.

A possible implementation for a single-carrier (SC) frequency division multiple access (FDMA) signal is described below with respect to FIG. 14. A possible implementation for a multicarrier signal over a wireless channel is described in the following.

For the implementation for a multicarrier signal over a wireless channel the processor 1310 is configured to select a numerology set 1313 from a quantity of at least two numerology sets 1311, 1312, wherein the numerology set 1313 identifies a set of multicarrier parameters for transmitting a multicarrier signal 1321 over a wireless channel, wherein the selection is based on a Signal-to-Noise Ratio (SNR) of the wireless channel, e.g. as described above with respect to FIGS. 1 to 11. The transmitter 1320 is configured to transmit the multicarrier signal 1322 based on the selected numerology set 1313, e.g. as described above with respect to FIGS. 1 to 11.

The quantity of numerology sets 1311, 1312, from which the processor 1310 is configured to select the numerology set 1313, increases with increasing SNR. For example, the quantity of numerology sets 1311, 1312 for a first SNR may include a subset of the numerology sets of the quantity of numerology sets 1311, 1312 for a second SNR where the second SNR is higher than the first SNR. A numerology set 1313 may be defined by a subcarrier spacing and a number of data symbols per subframe of the multicarrier signal 1321, e.g. as described above with respect to FIGS. 1 to 11.

The processor 1310 may be configured to select the numerology set 1313 based on predetermined knowledge of the wireless channel available for the transmitter device 1300. In one implementation, the processor 1310 may be configured to select the numerology set 1313 based on a capacity maximization metric of the wireless channel. In an alternative (or additional) implementation, the processor 1310 may be configured to determine the capacity of the wireless channel based on predicting an effective SNR at a receiver receiving the multicarrier signal 1321.

The processor 1310 may be configured to predict the effective SNR at the receiver based on computing a theoretical minimum mean squared error from previous pilots 301, 302, 303, 304 to each data symbol 305 received at the receiver according to second order statistics of the wireless channel, in particular according to a Doppler shift, a root mean squares (RMS) delay and a noise power of the wireless channel, e.g. as described above with respect to FIG. 3.

The processor 1310 may be configured to predict the effective SNR $\gamma_1$ at the receiver based on computing the following equation:

$$\gamma_1 = \frac{(1-\varepsilon)\cdot\gamma_0}{\varepsilon\cdot\gamma_0 + 1},$$

where $\gamma_0$ denotes the nominal SNR and $\varepsilon$ denotes the averaged mean squared error.

The processor 1310 may be configured to select the numerology set 1313 based on an overhead minimization metric with respect to non-data related time-frequency resources of the multicarrier signal 1321.

The non-data related time-frequency resources of the multicarrier signal 1321 may include a guard period 104, a cyclic prefix and a control channel 102 of the multicarrier signal 1321. The processor 1310 may be configured to select the numerology set 1313 based on the overhead minimization metric 820 if predetermined knowledge of the wireless channel is not available for the transmitter device 1300, e.g. as described above with respect to FIG. 8.

The processor 1310 may be configured to compute the overhead minimization metric 820 based on at least one of the following parameters of the multicarrier signal 1321: a number of control and pilot symbols 817, a subcarrier spacing 830, a cyclic prefix (CP) 815, a number of data symbols 831, a guard period (GP) 816, a latency constraint with respect to a transmission time interval (TTI) 825, e.g. as described above with respect to FIG. 8.

The processor 1310 may be configured to compute the overhead minimization metric 820 based on the following equation:

$$n_D^{opt} = \pm\sqrt{\frac{T_{LAT} - 2T_{GP}}{T_{CP}}} - n_T \quad f_{sc}^{opt} = \frac{1}{\sqrt{\frac{T_{LAT} - 2T_{GP}}{T_{CP}}} - T_{CP}},$$

where $n_T$ is the total number of control and pilot symbols, $f_{sc}$ is the subcarrier spacing, $T_{CP}$ is the CP, $n_D$ is the number of data symbols, $T_{GP}$ is the guard period and $\tau_{LAT}$ is the latency constraint for which the following latency constraint is applied:

$$(n_D + n_T)(1/f_{sc}) + 2T_{GP} < \tau_{LAT}$$

The transmitter 1320 may be configured to signal the selected numerology 1313 to a receiver receiving the multicarrier signal 1322 in a control channel.

Figure 14:
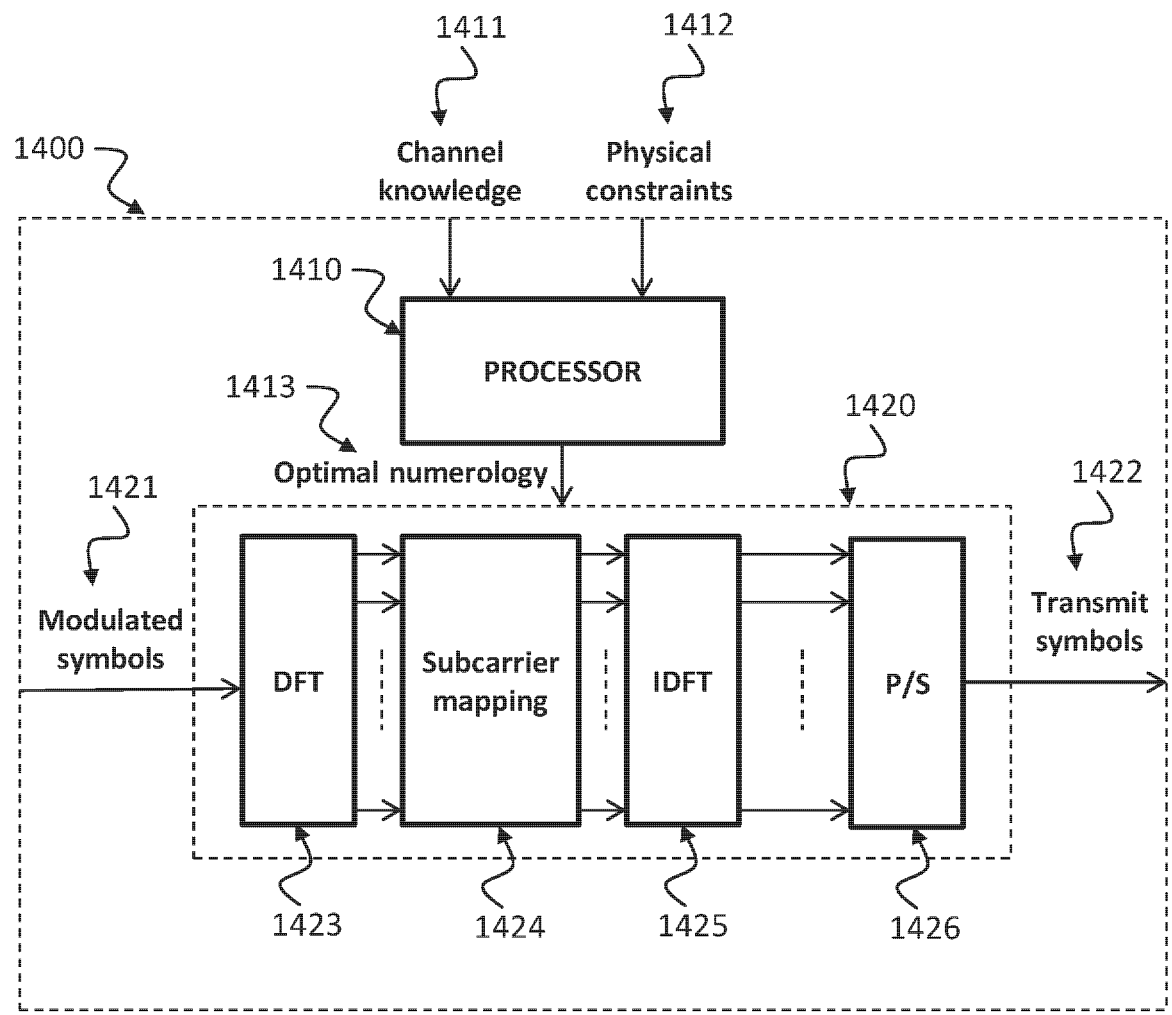
FIG. 14 shows a block diagram illustrating a transmitter device 1400 for use in a single-carrier communication system according to an implementation form.

FIG. 14 shows a block diagram illustrating a transmitter device 1400 for use in a single-carrier communication system according to an implementation form. The transmitter device 1400 is an implementation of the transmitter device 1300 described above with respect to FIG. 13 for a single-carrier (SC) signal such as a frequency division multiple access (FDMA) signal.

The transmitter device 1400 includes a processor 1410 and a transmitter 1420. The processor 1410 is configured to select an (optimal) numerology set 1413 from a quantity of at least two numerology sets, wherein the numerology set 1413 identifies a set of transmission parameters for transmitting a single-carrier signal, e.g. modulated symbols 1421 over a wireless channel, wherein the selection is based on a Signal-to-Noise Ratio (SNR) of the transmission channel, e.g. as described above with respect to FIGS. 1 to 11. The processor 1410 may use channel knowledge 1411 and physical constraints 1412 for such selection. The transmitter 1320 is configured to transmit the multicarrier signal 1322 based on the selected numerology set 1413, e.g. as described above with respect to FIGS. 1 to 11. The transmitter 1420 includes a DFT module 1423, a subcarrier mapping module 1424, an IDFT module 1425 and a parallel-to-serial conversion module 1426. The modulated symbols 1421 are transformed by the DFT module 1423 into frequency domain, mapped by the subcarrier mapping module 1424 onto subcarriers, transformed by the IDFT module 1425 to time domain and parallel-serial shifted by the P/S module 1426 to provide transmit symbols 1422 for transmission over the transmission channel.

In this implementation, a single carrier system such as Single Carrier-Frequency Division Multiplexing (SC-FDM) is considered. The system is identical to an OFDM, with the exception that an extra DFT block 1423 and a subcarrier mapping block 1424 are present ahead of the IDFT block 1425. Single carrier systems enjoy lower Peak to Average Power Ratio (PAPR), making it favorable to devices with limited power sources. Moreover, the system is more robust to Doppler shifts due to the spreading of the Doppler shift over all subcarriers. The above disclosed techniques can be used to tune the parameters of the single carrier system by taking into consideration the impact of the extra DFT block 1423 on the robustness towards Inter Carrier Interference.

Figure 15:
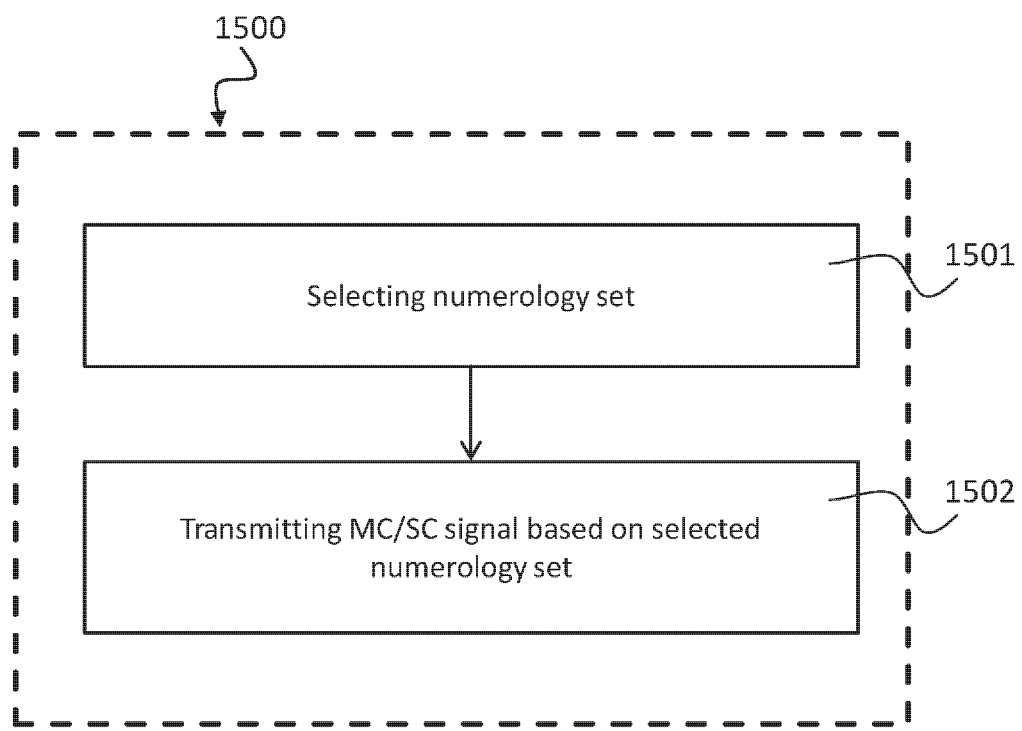
FIG. 15 shows a schematic diagram illustrating a method 1500 for transmitting a multicarrier signal in a wireless communication system according to an implementation form.

FIG. 15 shows a schematic diagram illustrating a method 1500 for transmitting a multicarrier signal in a wireless communication system according to an implementation form. The method is an implementation for a multicarrier signal in a wireless communication system, e.g. as described above with respect to FIGS. 1 to 13. Of course other implementations are possible as well, e.g., the transmission signal may be a multicarrier signal or a single-carrier signal, in particular a single-carrier (SC) frequency division multiple access (FDMA) signal, a filter bank multicarrier (FBMC) signal, a pulse shaped OFDM signal or a filtered OFDM signal as described above with respect to FIG. 13. The transmission channel may be a wireless channel, a digital subscriber line (DSL) channel, a powerline channel, an optical channel, a cable channel or a satellite channel as described above with respect to FIG. 13.

The method 1500 includes selecting 1501 a numerology set from a quantity of at least two numerology sets, wherein the numerology set identifies a set of multicarrier parameters for transmitting a multicarrier signal over a wireless channel, wherein the selection is based on a Signal-to-Noise Ratio (SNR) of the wireless channel, e.g. as described above with respect to FIGS. 1 to 13. The method further includes transmitting 1502 the multicarrier signal based on the selected numerology set, e.g. as described above with respect to FIGS. 1 to 13.

A more general version of the method 1500 includes: selecting a numerology set from a quantity of at least two numerology sets, wherein the numerology set identifies a set of transmission parameters for transmitting a transmit signal over a transmission channel, wherein the selection is based on a Signal-to-Noise Ratio (SNR) of the transmission channel, e.g. as described above with respect to FIGS. 1 to 13. The method further includes transmitting the transmit signal based on the selected numerology set, e.g. as described above with respect to FIGS. 1 to 13.

The present disclosure also supports a computer program product including computer executable code or computer executable instructions that, when executed, causes at least one computer to execute the performing and computing steps described herein, in particular the steps of the methods described above. Such a computer program product may include a readable non-transitory storage medium storing program code thereon for use by a computer. The program code may perform the processing and computing steps described herein, in particular the method 1500 described above.

While a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of embodiments of the disclosure beyond those described herein. While the present disclosure has been described with reference to one or more particular embodiments, those skilled in the art recognize that many changes may be made thereto without departing from the scope of the present disclosure. It is therefore to be understood that within the scope of the appended claims and their equivalents, embodiments of the disclosure may be practiced otherwise than as specifically described herein.

What is claimed is:

1. A device for use in a communication system, the device comprising:
   a processor configured to select a numerology set from at least two numerology sets, wherein the numerology set identifies a set of transmission parameters for transmitting a transmit signal over a transmission channel, wherein selecting the numerology set is based on an overhead minimization metric with respect to non-data related time-frequency resources of the transmit signal; and
   a transmitter configured to transmit the transmit signal based on the numerology set.

2. A device of claim 1,
   wherein the transmit signal is one of a single-carrier (SC) frequency division multiple access (FDMA) signal, a filter bank multicarrier (FBMC) signal, a pulse shaped OFDM signal, or a filtered OFDM signal; and
   wherein the transmission channel is one of a wireless channel, digital subscriber line (DSL) channel, power-line channel, optical channel, cable channel, or satellite channel.

3. A device of claim 2,
   wherein the transmission channel comprises a wireless channel;
   wherein the set of multicarrier parameters is for transmitting a multicarrier signal over the wireless channel; and
   wherein the transmitter is configured to transmit the multicarrier signal based on the numerology set.

4. A device of claim 3,
   wherein a quantity of numerology sets, from which the processor is configured to select the numerology set, increases with increasing signal-to-noise ratio (SNR) of the wireless channel.

5. A device of claim 3,
   wherein a first quantity of numerology sets for a first signal-to-noise ratio (SNR) comprises a subset of the numerology sets of a second quantity of numerology sets for a second SNR that is higher than the first SNR.

6. A device of claim 1,
   wherein a numerology set for a multicarrier signal as the transmit signal is defined by a subcarrier spacing and a number of data symbols per subframe of the multicarrier signal.

7. A device of claim 1,
   wherein the processor is configured to determine a capacity maximization metric of the transmission channel.

8. A device of claim 7,
   wherein the processor is configured to determine the capacity maximization metric of the transmission channel based on predicting an effective signal-to-noise ratio (SNR) at a receiver receiving the transmit signal.

9. A device of claim 8,
   wherein the processor is configured to predict the effective SNR at the receiver based on computing a theoretical minimum mean squared error from previous pilots to each data symbol received at the receiver according to second order statistics of the transmission channel, wherein the second order statistics include a Doppler shift, a root mean squares (RMS) delay, and a noise power of the transmission channel.

10. A device of claim 9,
wherein the processor is configured to predict the effective SNR $\gamma_1$ at the receiver based on computing the following equation:

$$\gamma_1 = \frac{(1-\varepsilon)\cdot\gamma_0}{\varepsilon\cdot\gamma_0 + 1},$$

wherein $\gamma_0$ denotes a nominal SNR and $\varepsilon$ denotes an averaged mean squared error.

11. A device of claim 1,
wherein the non-data related time-frequency resources of the transmit signal comprise a guard period, a cyclic prefix, and a control channel of the transmit signal.

12. A device of claim 11,
wherein the processor is configured to select the numerology set based on the overhead minimization metric in response to determining that predetermined knowledge of the transmission channel is not available for the device.

13. A device of claim 12,
wherein the processor is configured to compute the overhead minimization metric based on at least one of the following parameters of the transmit signal:
a number of control and pilot symbols,
a subcarrier spacing,
a cyclic prefix (CP),
a number of data symbols,
a guard period (GP), or
a latency constraint with respect to a transmission time interval (TTI).

14. A device of claim 13,
wherein the processor is configured to compute the overhead minimization metric based on the following equation:

$$n_D^{opt} = \pm\sqrt{\frac{T_{LAT} - 2T_{GP}}{T_{CP}}} - n_T \quad f_{sc}^{opt} = \frac{1}{\sqrt{\frac{T_{LAT} - 2T_{GP}}{T_{CP}}} - T_{CP}},$$

wherein $n_T$ is the number of control and pilot symbols, $f_{sc}$ is the subcarrier spacing, $T_{CP}$ is the CP, $n_D$ is the number of data symbols, $T_{GP}$ is the GP, and $\tau_{LAT}$ is the latency constraint for which the following latency constraint is applied:

$(n_D+n_T)(1/f_{sc})+2T_{GP} < \tau_{LAT}$.

15. A device of claim 1,
wherein the transmitter is configured to send a signal corresponding to the numerology set to a receiver receiving the transmit signal in a control channel.

16. A method for transmitting a transmit signal in a communication system, the method comprising:
selecting a numerology set from at least two numerology sets, wherein the numerology set identifies a set of transmission parameters for transmitting a transmit signal over a transmission channel, wherein selecting the numerology set is based on an overhead minimization metric with respect to non-data related time-frequency resources of the transmit signal; and
transmitting the transmit signal based on the numerology set.

17. A method of claim 16,
wherein the transmit signal is one of a single-carrier (SC) frequency division multiple access (FDMA) signal, a filter bank multicarrier (FBMC) signal, a pulse shaped OFDM signal, or a filtered OFDM signal; and
wherein the transmission channel is one of a wireless channel, digital subscriber line (DSL) channel, powerline channel, optical channel, cable channel, or satellite channel.

* * * * *